United States Patent [19]

Krall

[11] 4,096,223
[45] Jun. 20, 1978

[54] THERMOPLASTIC CONTAINER FORMING METHOD

[75] Inventor: Thomas J. Krall, Toledo, Ohio

[73] Assignee: Owens-Illinois, Inc., Toledo, Ohio

[21] Appl. No.: 792,828

[22] Filed: May 2, 1977

[51] Int. Cl.² .................................................. B29C 17/07
[52] U.S. Cl. ........................................... 264/89; 264/97;
264/98; 425/530; 425/534
[58] Field of Search ......................... 264/89, 94, 96–99,
264/296; 425/525, 530, 532–534

[56] References Cited

U.S. PATENT DOCUMENTS

| | | | |
|---|---|---|---|
| 3,008,192 | 11/1961 | Allen et al. | 264/97 |
| 3,019,480 | 2/1962 | Soubier | 264/97 |
| 3,048,890 | 8/1962 | Soubier | 264/99 |
| 3,583,031 | 6/1971 | Kader et al. | 425/534 X |
| 3,944,642 | 3/1976 | Uhlig | 264/97 X |
| 3,978,184 | 8/1976 | Dybala et al. | 264/89 |
| 4,007,243 | 2/1977 | Rupert | 264/89 |

FOREIGN PATENT DOCUMENTS 2,364,663  10/1975  Germany ..................... 425/534

Primary Examiner—Jan H. Silbaugh
Attorney, Agent, or Firm—Steven M. McLary; Myron E. Click; David H. Wilson

[57] ABSTRACT

A method for forming thermoplastic containers utilizing a final blow station remote from a parison formation station. In the method, a finish portion of a plastic container is formed by the injection of molten thermoplastic material into a neckring. The neckring is then moved relative to the thermoplastic material issuing orifice while the flow of material continues. This causes formation of a tubular parison. The parison is then transported, while hanging from the neckring, to a final blow station where a blow mold or final shape mold closes around it. The parison is then blown to the contours of the interior of the blow mold. While this is taking place, a second neckring has been brought into registry with the material orifice and a new parison formed. The second parison is then moved to the final blow station while the finished plastic container is moved to a removal station.

10 Claims, 12 Drawing Figures

THERMOPLASTIC CONTAINER FORMING METHOD

BACKGROUND OF THE INVENTION

This invention generally relates to a method for forming a thermoplastic container. More particularly, this invention relates to such a method in which the container finish is injection molded in a neckring and a tubular parison then formed by relative movement of the finish portion and the material orifice. Specifically, this invention relates to such a method in which the tubular parison is removed to a final blow station for formation into a finished container to allow formation of a new tubular parison during the blowing of the previously formed tubular parison.

The present invention is concerned with an improved operational method for a plastic bottle forming machine of the type generally shown in U.S. Pat. No. 3,019,480 and 3,008,192, the teachings of which are hereby incorporated by reference. This general type of plastic bottle forming machine utilizes a neck mold or neckring into which a charge of plastic material is injected to thereby form the finish portion of the plastic bottle. The mold is then moved upwardly as plastic material is allowed to continue to extrude from the orifice thereby pulling an elongated tubular parison. When the desired length of parison is reached, a final blow mold closes about the parison and the bottle is blown to final shape by high pressure air. The finished container is then removed from the orifice area and the neck mold moved downwardly into intimate contact with the orifice for injection of a new finish portion and repetition of the cycle. It is clear from this description of the forming cycle that this type of machine could be described as a series type machine. That is, all the operations for the formation of a single plastic container take place in the same general location. It is therefore not possible to form a parison in one location and transfer it to a second location for blowing while a new parison is simultaneously being formed. While machines of the type described have met with substantial commercial success and are in general use throughout the world, this limitation in speed has to some extent limited their overall acceptance and usefulness. Of course, such machines commonly utilize multiple orifices and blow molds so that a number of bottles, six to eight for example, are being formed simultaneously. However, it would be desirable to change the cycle of such a machine to a parallel type operation in which the formed parison may be removed to a separate location for final blowing while a new parison is simultaneously being injected and drawn. It is to this end that the operational method of the present invention is directed. U.S. Pat. No. 3,048,890 is one example of an attempt to improve the process cycle of plastic forming machines of this general class. However, this particular patent required the installation of two separate extrusion orifices and two separate turntables to carry blow molds and neckrings. Additionally, this particular patent taught a rather complex and involved overlapping forming cycle, which would require basic redesign of the plastic forming machine. The present invention would allow utilization of the basic forming machines as they now exist with some modification to meet the demands of this new cycle.

SUMMARY OF THE INVENTION

A supply of thermoplastic material is supplied from an extrusion orifice into a neckring cavity which is carried by a neckring holder. Once a finish has been injected into the neckring cavity, the neckring holder is moved relative to the orifice to thereby form an elongated tubular parison. The elongated tubular parison is removed from proximity to the extrusion orifice along with the neckring holder and neckring and hangs from the neckring. A final shape mold is then closed around the suspended parison. High pressure gas is used to expand the parison to the shape of a cavity formed within the final shape mold. Simultaneously with these steps, a second neckring carried by a second neckring holder is positioned adjacent the extrusion orifice and a finish portion is injection molded into the neckring. The extrusion orifice and neckring holder and neckring are then moved relative to one another to form a second parison while the first parison is being blown to its final shape. The final shape mold is opened after the blowing cycle is completed and the completed plastic container is left suspended from the neckring. The first neckring holder and neckring then remain in a fixed location while the second neckring holder and neckring are removed from proximity to the extrusion orifice, simultaneously therewith removing the newly extruded parison. As this occurs, the finished container is moved to a remote removal location and the first neckring holder and neckring are repositioned adjacent the extrusion orifice to begin the cycle of injection molding of the container finish and formation of the parison again.

DETAILED DESCRIPTION OF THE DRAWINGS

Figure 1:
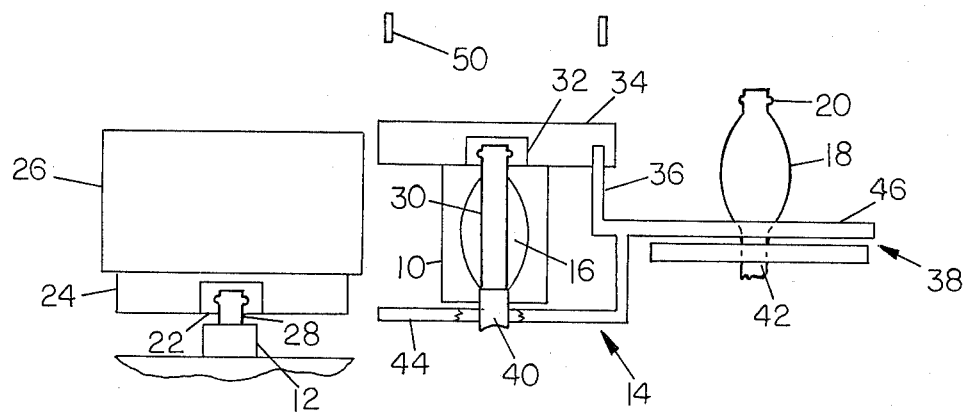
FIG. 1 is a schematic view of a plastic forming machine just beginning a new cycle.

In the description of the method which follows, it will be readily apparent that the drawings utilized in describing the method are highly schematic in nature. It is believed that one skilled in the art would be quite aware of the mechanical devices necessary to implement this particular cycle. Additionally, reference is again made to the cited U.S. patents for details of various transfer and drive mechanisms of the plastic forming machine itself. It is with the forming method that the present invention is concerned, rather than any specific apparatus for carrying out this method, and therefore the schematic drawings are believed most representative and most likely to clearly explain the method of the present invention without unnecessary mechanical complications. In FIG. 1, the plastic forming machine is seen in its configuration just at the beginning of a new cycle. One of the most striking and quickly apparent aspects of the present method is that a final blow mold 10 is not located in line with an extrusion orifice 12 as is normally the case of machines in this class. Rather, the final blow mold 10 is positioned adjacent to a movable carrier slide 14 which is mounted offset from the extrusion orifice 12. The carrier slide 14 is movable from a location such as that shown in FIG. 1 to a location substantially over the extrusion orifice 12. The movement may be performed by any number of conventional means such as hydraulic cylinders, air cylinders, electric motors or other mechanical drive means. The final blow mold 10 contains within it a cavity 16 which defines the final shape to which a plastic container such as that shown at 18 may be blown. The plastic container 18 includes an upper finish portion 20 to which a closure may be attached in its utilization. The finish portion 20 is a relatively dimensionally critical portion and is thus, in this particular process, the first portion of the plastic container which is formed. The thermoplastic material which issues from the extrusion orifice 12 is injected into a neckring 22 which is carried by a neckring holder 24. The neckring 22 is of the type which may be opened and closed to release any finish portion which is injection molded into it. The neckring holder 24 is carried by a vertically movable slide member 26 which is a portion of the total forming machine. As the plastic material being injected into the neckring 22 fills the neckring, the slide portion 26 will begin to move upward and pull material from the orifice 12 as the material issues therefrom. The result is the formation of a tubular parison 30, shown contained within the final blow mold 10. The parison 30 is held in a second neckring 32 which is carried by a second neckring holder 34. The neckring holder 34 is trapped and held by a carrier arm 36. The carrier arm 36 is a part of the carrier slide 14 and is designed to releasably hold either the second neckring holder 34 or, as will be shown, the first neckring holder 24. Also as a part of the total plastic forming machine a tail remover section 38 is provided. In this general forming process the containers are formed with tail portions such as those shown at 40 on the parison 30 and 42 on the plastic container 18. These tail portions constitute unusable sections of plastic material and are removed from the completed containers in the tail removing section 38. Such devices are well known in the art and may be seen for example in U.S. Pat. No. 3,060,497, the teachings of which are hereby incorporated by reference. The carrier slide 14 actually includes two sections which can grip the tail portions of the containers being formed. A forward tail gripping section 44 is designed to remove an extruded tube from the extrusion orifice 12 and help support it during the blowing process. A rear tail gripping portion 46 is designed to move a finished container 18 from its blow molding position to the location of the tail removing portion 38. Both the forward and the rear tail gripping portions 44 and 46 may be opened and closed to grasp and release tail portions therefrom.

Figure 2:
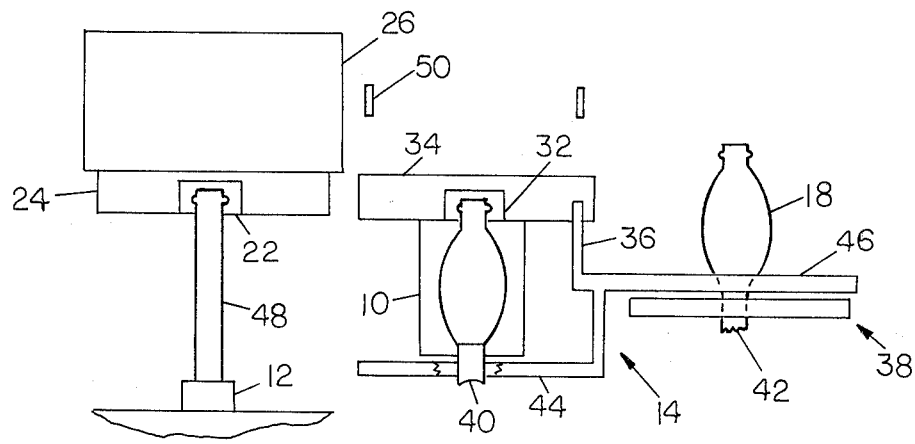
FIG. 2 is a view similar to FIG. 1 showing the formation of a tubular parison.

In FIG. 2, a second or new parison 48 has been formed by the combined action of the extrusion orifice 12 furnishing thermoplastic material and the upward movement of the slide portion 26. It should be kept in mind that the finish portion has been injection molded into the neckring 22 and is a relatively rigid member at this point. While this action has been taking place, the previous parison 30 has been blown into conforming relationship with the cavity 16 of the blow mold 10. It may be seen that there are now visible two completed containers, the container 18 which is at the tail removing section 38, which is also a removal station, and the container which is now within the final blow mold 10. Although the precise point in the cycle where the tail 42 of the finished container 18 is removed is not critical, it is generally done at this time. Once the tail has been removed, the finished container 18 is ejected onto a removal system.

Figure 3:
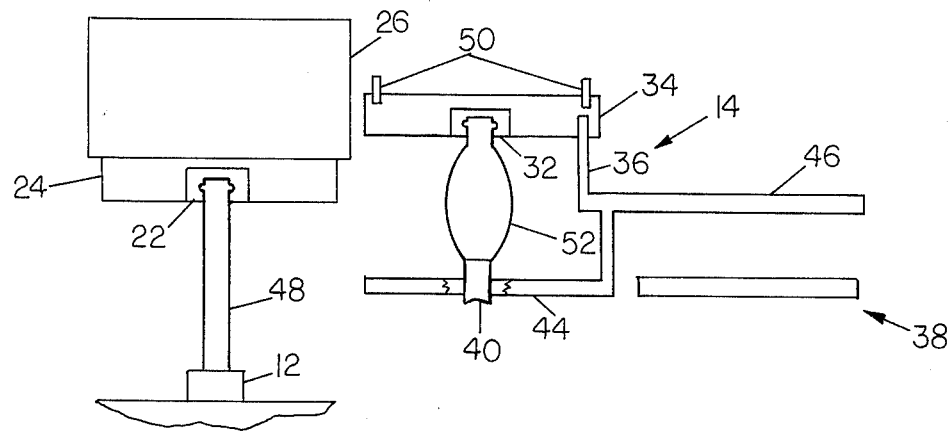
FIG. 3 is a view similar to FIG. 1 showing the movement of a completed container away from the final blow station.

FIG. 3 illustrates that the next stage of the cycle involves an upward movement of the entire carrier slide 14. Note that the finished container 18 has now been removed. The tail removal section 38 generally remains fixed in its location while the carrier slide 14 moves upward. At the extreme end of its upward travel, the second neckring holder 34 is trapped and held by latch members 50. The latch members 50 hold the second neckring holder 34 in this upward position and release it from the grasp of the carrier arm 36. This then leaves a newly formed plastic container 52 suspended from the second neckring 32. Note that the blow mold 10 is not shown in FIG. 3 for purposes of simplicity. It is of course apparent that before the upward movement takes place, the final blow mold 10 has opened to allow removal of the finished plastic container 52. Additionally, the forward tail gripping portion 44 must also open to release the tail portion 40 to allow additional movement of the carrier slide 14. Likewise, the rear tail gripping portion 46 will open, or may be allowed to remain open from its release of the finished plastic container 18.

Figure 4:
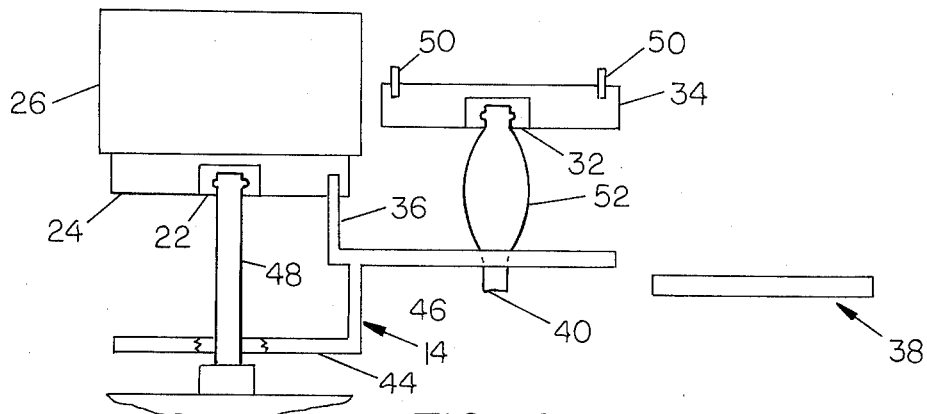
FIG. 4 is a view similar to FIG. 1 showing grasping of the tubular parison for transport to the final blow station.

FIG. 4 illustrates that the next movement in the cycle is for the carrier slide 14 to move downward to generally the position it had assumed in FIGS. 1 and 2 and then move inward so that the forward tail gripping portion 44 generally overlies the extrusion orifice 12. Note that because the forward gripping portion 44 and rear gripping portions 46 are both open, the carrier slide 14 may pass through the newly formed plastic container 52 hanging from the second neckring holder 34. Once this action has occurred, the carrier arm 36 will come into contact with the first neckring holder 24 and grasp it for removal from the slide portion 26. Additionally, the forward and rear gripping portions 44 and 46 will close respectively on the tail 40 of the new plastic container 52 and the newly formed parison 48. In addition, the neckrings 32 carried by the second neckring holder 34 will also open at about this time to allow removal of the newly formed plastic container 52 from them. The first neckring holder 24 is held in position on the slide 26 in ways or gibs which are conventional and well known in the art. These prevent motion in a vertical fashion but allow horizontal or translational motion as provided by the carrier arm 36 when the carrier slide 14 retracts.

Figure 5:
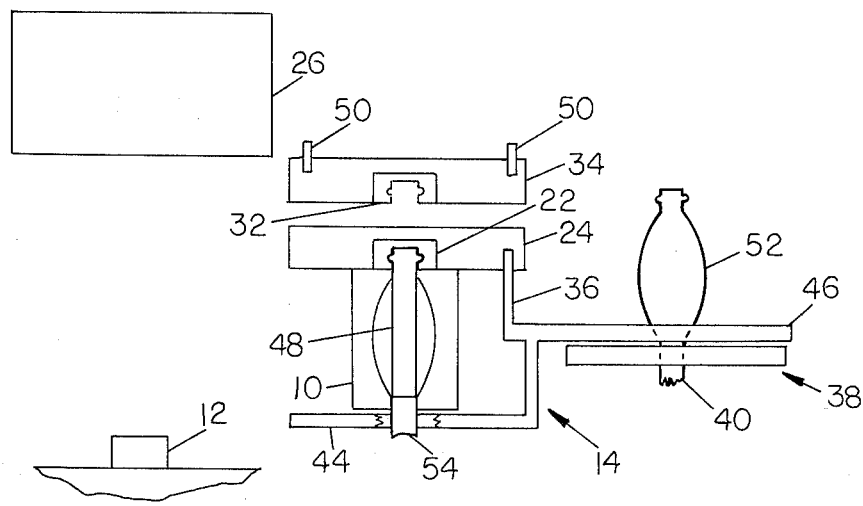
FIG. 5 is a view similar to FIG. 1 showing the tubular parison in position at the final blow station and the completed container at a removal station.

FIG. 5 illustrates the position of the machine parts after the carrier slide 14 has moved to its position in registry with the blow mold 10 at a blow molding station. At this time the slide portion 26 has also moved upward to allow insertion of the second neckring holder 34 into it. The blow mold 10 will close around the newly formed parison 48 and the tail portion 54 of the parison 48 is held in the forward tail gripping portion 44 of the carrier slide 14. The configuration shown in FIG. 5 is very similar to that of FIG. 1, except for the relative position of the mold slide 26 in the extrusion orifice 12. The second neckring holder 34 remains held by the latches 50 at a location above the first neckring holder 24.

Figure 6:
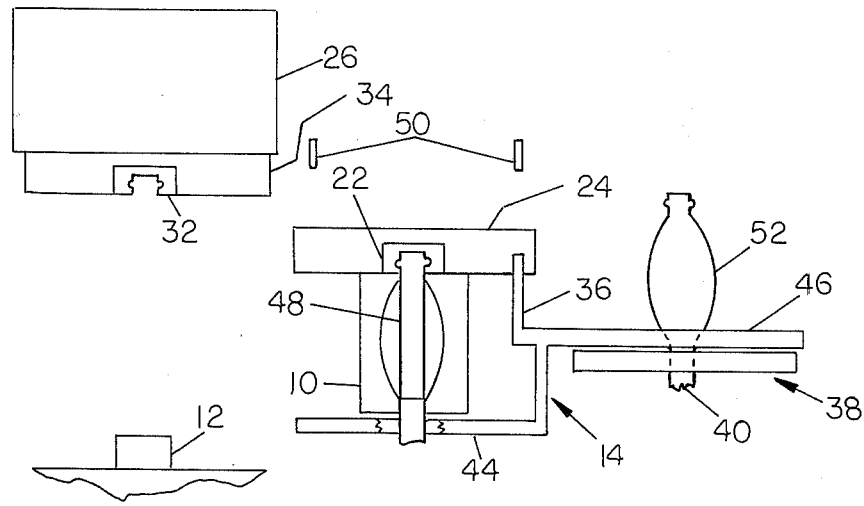
FIG. 6 is a view similar to FIG. 1 with all components of the machine ready to return to the configuration of FIG. 1 to begin the cycle again.

In FIG. 6, the second neckring holder 34 has been pushed into engagement with the slide portion 26 and released from the latches 50. This particular motion may be performed by any of several mechanical drive mechanisms such as hydraulic or air cylinders or electrical motor drive mechanisms. The latches 50 are released to allow movement of the second neckring holder 34 into engagement with the gibs or slides of the slide portion 26 which hold the neckring holders in place. In the configuration shown in FIG. 6 all that need be done to achieve the state of a new complete cycle, as seen in FIG. 1, is for the slide portion 26 to move downwardly over the extrusion orifice 12 to present the second neckring 32 in registry with the extrusion orifice 12 for the injection of a new plastic container finish portion.

FIGS. 7 through 12 illustrate a somewhat different embodiment from the present invention, still utilizing the basic principle outlined in FIGS. 1 through 6. The primary difference between the embodiments of FIGS. 7 through 12 and that of FIGS. 1 through 6 is the addition of a preform mold at the parison formation station, as will be described in more detail. Those components of the machine which remain the same in this embodiment with those previously described will be given the same number as previously used.

Figure 7:
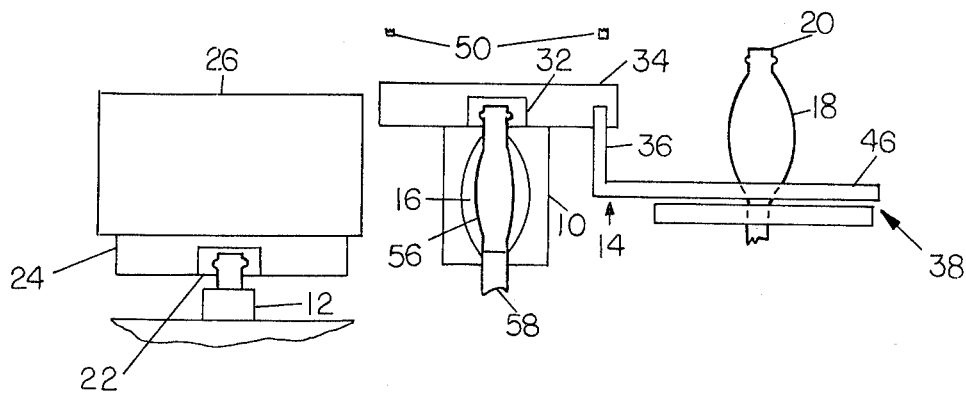
FIG. 7 is a schematic view of a plastic forming machine, whose operational method illustrates a second embodiment of the present invention, just beginning a new cycle.

FIG. 7 is basically identical with FIG. 1 in that it illustrates the beginning of a machine cycle. Note that in the case of the blow mold 10, rather than having contained within it a tubular parison 30 as shown in FIG. 1, the blow mold 10 shown in FIG. 7 contains a preform shape 56. Note that the preform shape 56 in many respects is somewhat similar to the tubular parison 30, including the fact that it includes a tail portion 58. The cavity portion 16 of blow mold 10 may be identical to that previously described, and the finished plastic container 18 which is formed using the preform shape 56 may also be substantially identical to that previously formed. This container would include a finish portion 20. As was shown in FIG. 1, the orifice 12 is issuing the thermoplastic material into the neckring 22 carried by the neckring holder 24 which is mounted on the slide member 26. Likewise, the preform shape 56 is carried by its neckring 32 which is held in a neckring holder 34. The neckring holder 34 is still trapped by the carrier arm 36 which is still a part of the carrier slide 14. However, in this case, the forward tail gripping section 44 of the carrier slide 14 is absent from the embodiment shown in FIG. 7. This is so because the use of preform techniques allows the preform shape 56 to be set up sufficiently that its tail portion 58 is rigid enough to not require grasping at the time of removal from the vicinity of the orifice 12.

Figure 8:
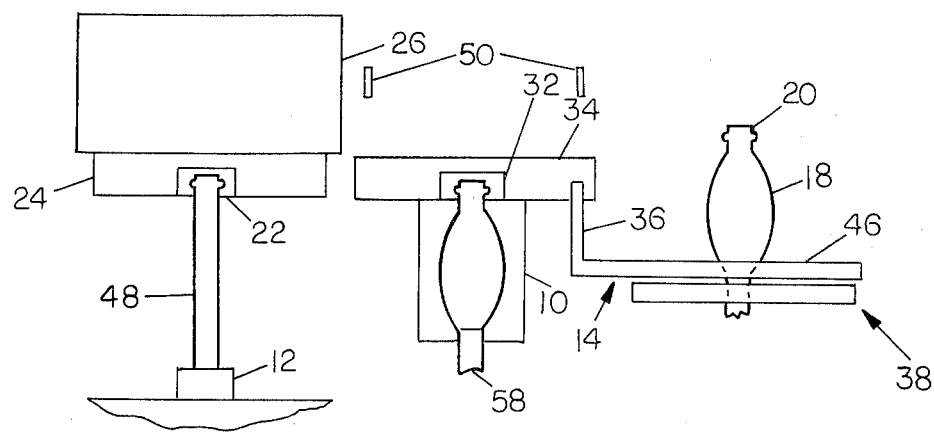
FIG. 8 is a view similar to FIG. 7 showing the formation of a tubular parison.
Figure 9:
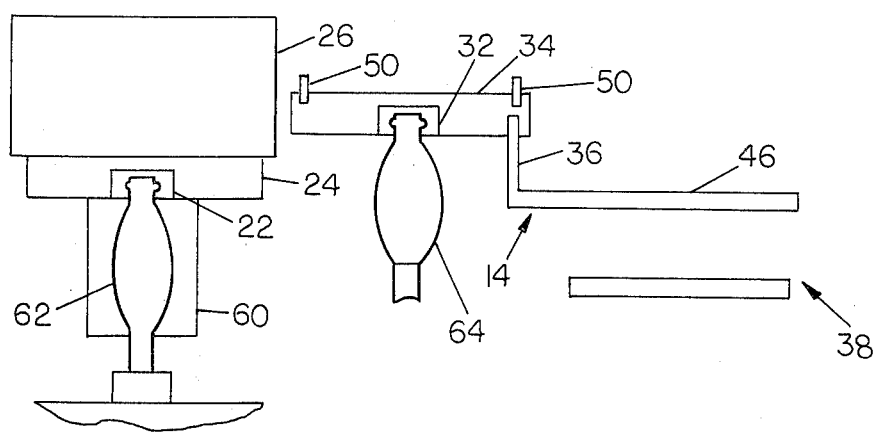
FIG. 9 is a view similar to FIG. 7 showing the movement of a finished container away from the final blow station and the closing of a preform mold on the tubular parison to allow formation of a preform shape.

FIG. 8 is basically identical to FIG. 2. It may be seen in FIG. 8 that the preform shape 56 has been blown out into conformity with the contours of the blow mold 10. In addition, a tubular parison 48 has been extruded and drawn as was previously described with respect to FIG. 2. At this point, however, the distinction in the operating methods of this embodiment and that previously described will become apparent. In FIG. 9, it may be seen that a preform shape mold 60 has been closed around the tubular parison 48 and it has been blown out into general conformity with the interior of the preform mold 60 to form a second preform shape 62. As also seen in FIG. 9, the preform shape 56 has now been blown into a finished container 64 which is suspended from its neckrings 32, the blow mold 10 having been opened. Again note that this FIG. 9 is substantially identical in this respect to FIG. 3, but now the preform mold 60 has been utilized to partially shape the tubular parison 48.

Figure 10:
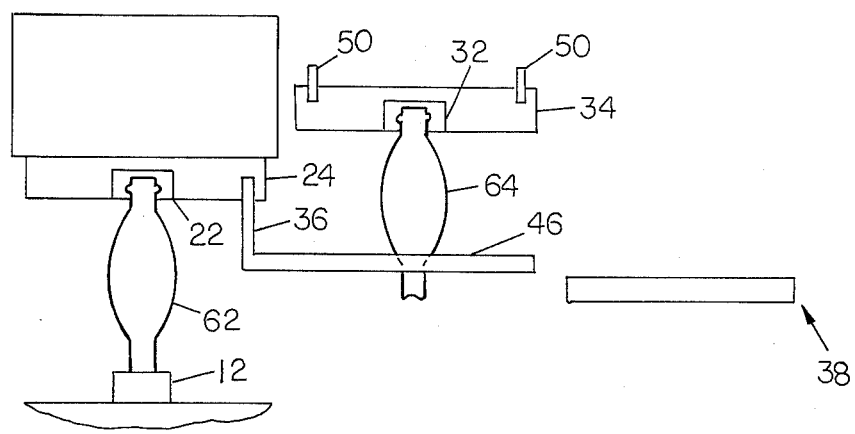
FIG. 10 is a view similar to FIG. 7 showing grasping of the carrier for the preform for moving it to the final blow station.
Figure 11:
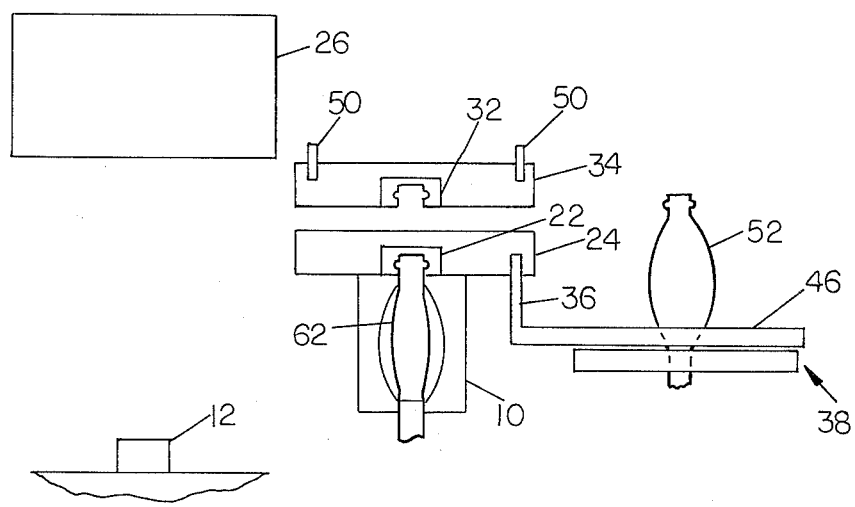
FIG. 11 is a view similar to FIG. 7 showing the preform shape in position at the final blow station and the completed container at a removal station.

It may be seen in FIG. 10 that the second finished container 64 has been moved upwardly along with its neckring 32 and neckring holder 34 and engaged by the latch members 50 which allow release of the neckring holder 34 from the carrier arm 36. The carrier arm 36 then moves inwardly to engage the neckring holder 24 and its associated neckring 22. In this case, the second preform shape 62 is suspended from the neckring 22. The advantage of this particular embodiment is apparent at this point. It is not necessary to have the second forward tail gripping portion 44 grasp the tail portion of the second preform shape 62. Utilization of the preform mold 60 imparts sufficient rigidity to the preform shape 62 that it is not required that the bottom portion be stabilized during transfer into the final blow molding position. A tail portion is still formed, but this is then removed later at the tail removing portion 38. FIG. 11 illustrates that the second newly formed plastic container 52 has been grasped by the rear tail gripping portion 46 and removed to the tail removing section 38. This then leaves its neckring holder 34 and neckring 32 suspended from the latch mechanisms 50. At the same time, the carrier arm 36 has engaged and retracted the neckring holder 24 and neckring 22, from which the second preform shape 62 is still suspended. The blow mold 10 has closed around the second preform shape 62 in preparation for a new molding cycle.

Figure 12:
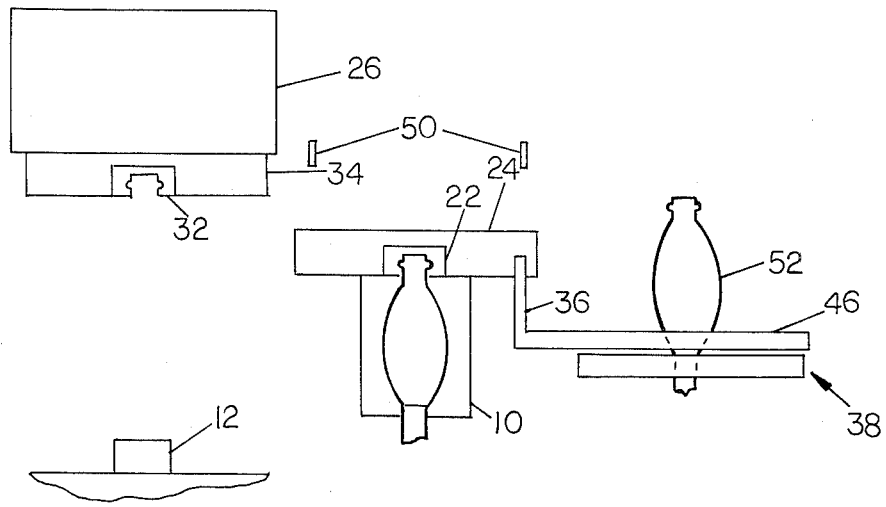
FIG. 12 is a view similar to FIG. 1 with all components of the machine ready to return to the configuration of FIG. 7 to begin the cycle again.

Finally, FIG. 12 shows the neckring holder 34 and neckring 32 having been moved back into engagement with the slide portion 26 ready to be moved downward into registry with the orifice 12 for the injection and extrusion of a new tubular parison and formation of a preform shape after formation of the tubular parison by use of the preform mold 60.

I claim:

1. A method for making a plastic container, wherein fluid, plasticized, thermoplastic material is supplied by a plasticizer-extruder, which comprises the steps of:
   (a) injection molding a finish portion of a plastic container by injecting thermoplastic material from an orifice into an openable neckring carried by a first neckring holder;

(b) moving said orifice and said neckring and neckring holder relative to one another while continuing to supply thermoplastic material to thereby form a tubular parison;

(c) grasping said tubular parison and said neckring holder;

(d) moving said tubular parison and said neckring and neckring holder away from said orifice into registry with a blow molding station;

(e) closing a blow mold about said tubular parison at said blow molding station;

(f) blowing said parison, while in said blow mold, into a final shape, finished plastic container;

(g) moving a second neckring carried by a second neckring holder into registry with said orifice;

(h) injection molding a finish portion of a second plastic container by injecting thermoplastic material from said orifice into said second neckring;

(i) moving said orifice and said second neckring and neckring holder relative to one another while continuing to supply thermoplastic material to thereby form a second tubular parison, steps (g), (h), and (i) being carried out substantially simultaneously with steps (e) and (f);

(j) opening said blow mold;

(k) moving said first mentioned neckring and neckring holder away from said blow molding station while carrying said finished plastic container in said neckring;

(l) substantially simultaneously, grasping said second tubular parison and said second neckring holder and grasping said finished plastic container with a removal mechanism as said first mentioned neckring is opened;

(m) substantially simultaneously, moving said second tubular parison and said second neckring holder away from said orifice into registry with said blow molding station and moving said finished plastic container to a removal station;

(n) closing said blow mold about said second tubular parison;

(o) blowing said second tubular parison, while in said blow mold, into a final shape, finished plastic container;

(p) moving said first mentioned neckring and neckring holder back into registry with said orifice; and (q) repeating steps (a) through (p) in overlapping cycle.

2. The method of claim 1 wherein step (b) includes the step of:
translating said neckring and neckring holder vertically upward with respect to said orifice by movement of a slide member carrying said neckring and neckring holder.

3. The method of claim 1 wherein step (d) includes the step of:
displacing said neckring and neckring holder away from said orifice in a substantially horizontal plane.

4. The method of claim 1 wherein step (g) includes the steps of:
displacing said second neckring and neckring holder in a substantially horizontal plane into locking engagement with a slide member of carrying neckring holders; and
translating said slide member vertically downward until said second neckring is in registry with said orifice.

5. The method of claim 1 which includes the further step of:
removing a tail portion of said finished plastic container at said removal station.

6. A method for making a plastic container, wherein fluid, plasticized, thermoplastic material is supplied by a plasticizer-extruder, which comprises the steps of:

(a) injection molding a finish portion of a plastic container by injecting thermoplastic material from an orifice into an openable neckring carried by a first neckring holder;

(b) moving said orifice and said neckring and neckring holder relative to one another while continuing to supply thermoplastic material to thereby form a tubular parison;

(c) closing a preform mold around said tubular parison;

(d) blowing said tubular parison into conformity with the interior of said preform mold to thereby define a preform shape;

(e) opening said perform mold;

(f) moving said preform shape and said neckring and neckring holder away from said orifice into registry with a blow molding station;

(g) closing a blow mold about said preform shape at said blow molding station;

(h) blowing said preform shape, while in said blow mold, into a final shape, finished plastic container;

(i) moving a second neckring carried by a second neckring holder into registry with said orifice;

(j) injection molding a finish portion of a second plastic container by injecting thermoplastic material from said orifice into said second neckring;

(k) moving said orifice and said second neckring and neckring holder relative to one another while continuing to supply thermoplastic material to thereby form a second tubular parison, steps (i), (j), and (k) being carried out substantially simultaneously with steps (g) and (h);

(l) closing said preform mold around said second tubular parison;

(m) blowing said second tubular parison into conformity with the interior of said preform mold to thereby define a second preform shape;

(n) opening said blow mold;

(o) moving said first mentioned neckring and neckring holder away from said blow molding station while carrying said finished plastic container in said neckring;

(p) opening said preform mold;

(q) substantially simultaneously, grasping said second neckring holder and grasping said finished plastic container with a removal mechanism as said first mentioned neckring is opened;

(r) substantially simultaneously, moving said second preform shape and said second neckring holder away from said orifice into registry with said blow molding station and moving said finished plastic container to a removal station;

(s) closing said blow mold about said second preform shape;

(t) blowing said second preform shape, while in said blow mold, into a final shape, finished plastic container;

(u) moving said first mentioned neckring and neckring holder back into registry with said orifice; and (v) repeating steps (a) through (u) in overlapping cycle.

7. The method of claim 6 wherein step (b) includes the step of:

translating said neckring and neckring holder vertically upward with respect to said orifice by movement of a slide member carrying said neckring and neckring holder.

8. The method of claim 6 wherein step (f) includes the step of:

displacing said neckring and neckring holder away from said orifice in a substantially horizontal plane.

9. The method of claim 6 wherein step (i) includes the steps of:

displacing said second neckring and neckring holder in a substantially horizontal plane into locking engagement with a slide member for carrying neckring holders; and translating said slide member vertically downward until said second neckring is in registry with said orifice.

10. The method of claim 6 which includes the further step of:

removing a tail portion of said finished plastic container at said removal station.

* * * * *